R. W. SANBORN.
Bridles.

No. 152,518. Patented June 30, 1874.

Witnesses.
E. F. Lunan
H. W. Dodge

Inventor.
R. W. Sanborn
By Dodge & Son
His attys.

UNITED STATES PATENT OFFICE.

RODMAN W. SANBORN, OF ROCHESTER, NEW YORK.

IMPROVEMENT IN BRIDLES.

Specification forming part of Letters Patent No. 152,518, dated June 30, 1874; application filed December 30, 1873.

*To all whom it may concern:*

Be it known that I, RODMAN W. SANBORN, of Rochester, in the county of Monroe and State of New York, have invented certain Improvements in Bridles, of which the following is a specification:

My invention relates to an improved bridle for unruly horses; and consists in applying to an ordinary bridle a rein which passes across the animal's nose, through the ends of the bit, and back over his head between the ears, with its ends attached to the usual driving reins; and also in applying to said rein an adjustable slide in front of the animal's head.

Figure 1:
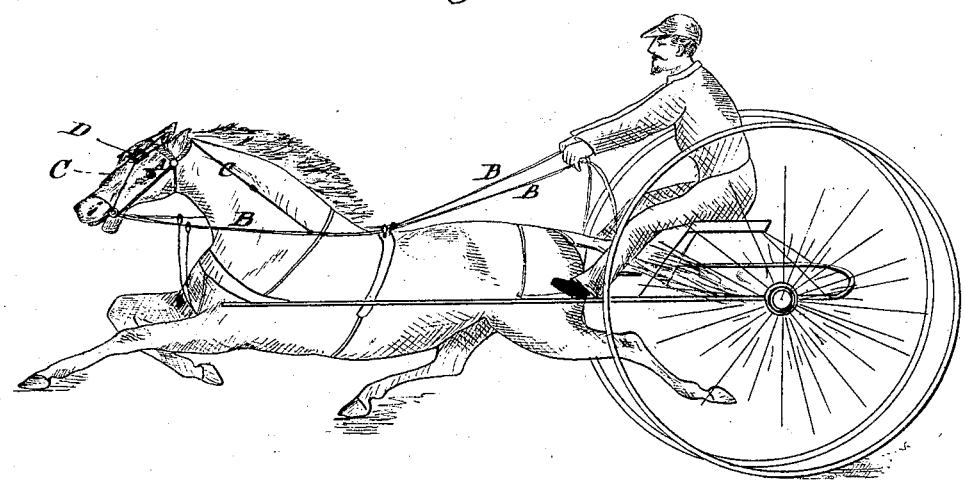
Figure 2:
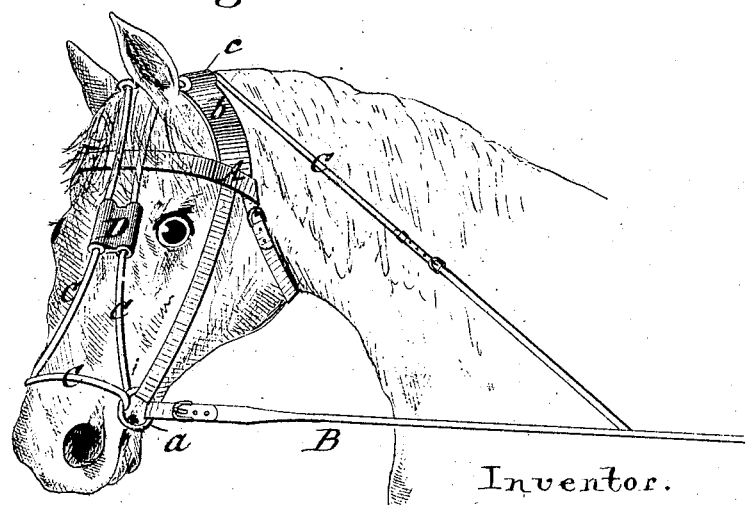

Figure 1 is a view showing a harnessed horse with my bridle on; Fig. 2, an enlarged view of the animal's head, showing more clearly the construction of the bridle.

A represents an ordinary bridle, consisting of a head-stall, bit, and throat-latch, but without the usual check-rein. B are the driving-reins, attached to the ends of the bit a, and carried back through the terrets on the saddle, as usual. C is my improved check and driving rein, which passes across the animal's nose, and has its ends carried through the rings a on the bit and then up side by side between the animal's ears, through guide-loops b on the head-stall, and then downward to the driving-reins B, to which they are attached at a point just forward of the terrets, as shown in Figs. 1 and 2. The ends of the rein C are connected with the driving reins by means of buckles d or any other device which will admit of their being lengthened and shortened.

It will be seen that when a strain is brought upon the rein C, arranged as shown, it will tend to draw the animal's head up, and at the same time drawing through the ends of the bit will draw down tightly around the animal's nose and compress the upper jaw between it and the bit. This compression of the upper jaw is so effective as to bring the most stubborn animal under control.

In using my bridle, if the animal is a gentle one and easily controlled, the rein C has its ends slackened, so that in ordinary driving there will be little or no strain on said rein when the animal holds his head up in position. Should the animal, however, stumble, or from any other reason throw his head down, the rein C will be thereby tightened, so as to cause him to raise it again. In case the animal becomes unruly, the rider, drawing strongly on the driving-reins B, also brings the rein C into play.

When the bridle is used on a horse that is fractious or unruly, the ends of the rein C are shortened up, so that the driving-reins B will keep a constant strain thereon. When thus adjusted the rein C serves both as a check and as a driving or guiding rein, and gives the driver perfect control over the animal.

In front of the animal's face I mount a slide or loop, D, clasping around the two branches of the rein C, and holding them close together. By moving this slide up and down the two branches or parts of the rein may be brought together at any desired distance above the ends of the bit. By thus changing the adjustment of the rein its action on the animal may be varied to suit his peculiarities of form and habit.

Having described my invention what I claim is—

The bridle provided with the rein C passing over the animal's nose, loosely through the ends of the bit, up the animal's face, between his ears, through loops c on the head-stall, and then finally attached to the driving-reins B, as shown and described.

RODMAN W. SANBORN.

Witnesses:
P. T. DODGE,
E. F. GUNSON.